July 20, 1926.
I. D. ANSELL
VEHICLE VENTILATOR
Filed Dec. 26, 1924
1,592,841
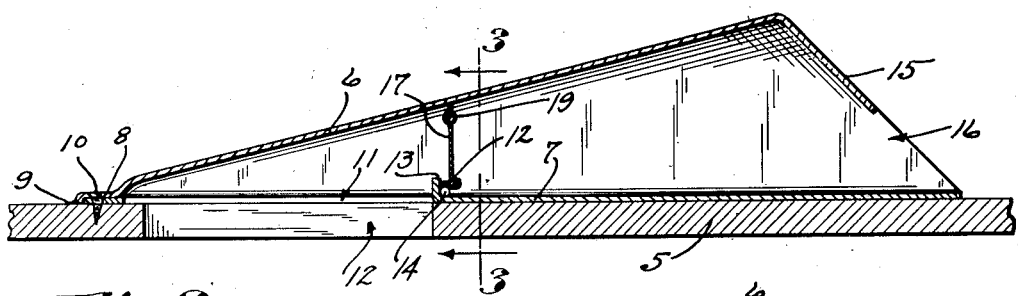
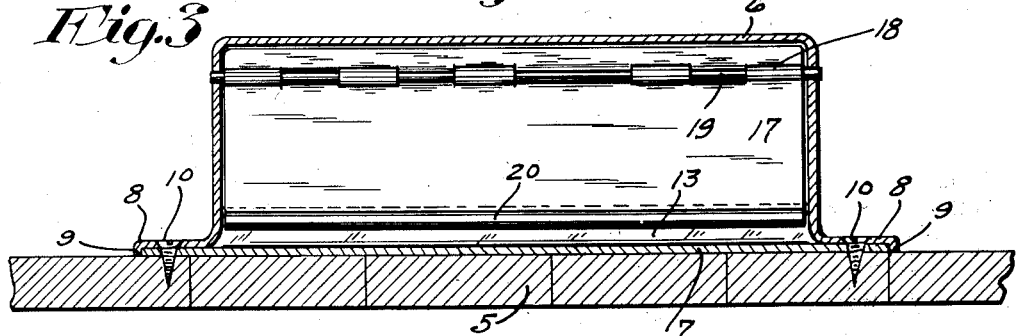
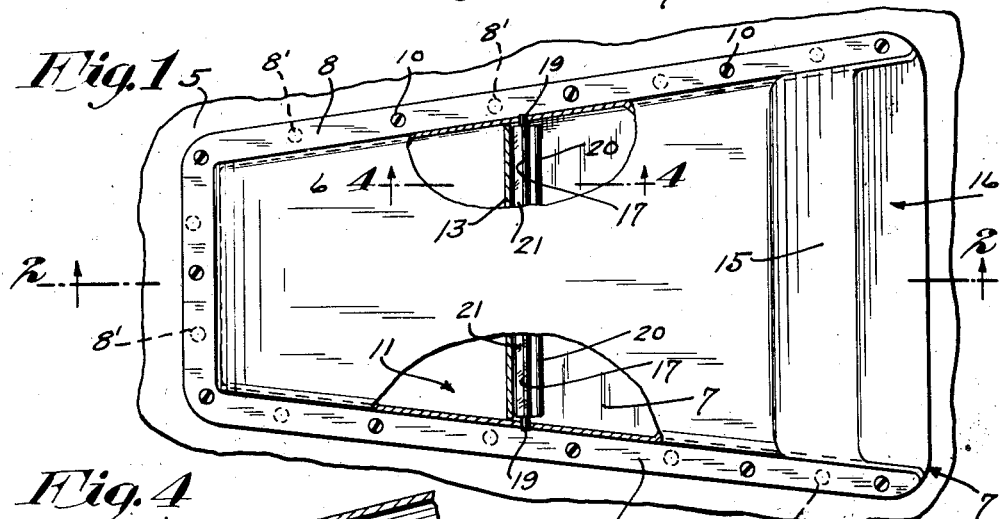
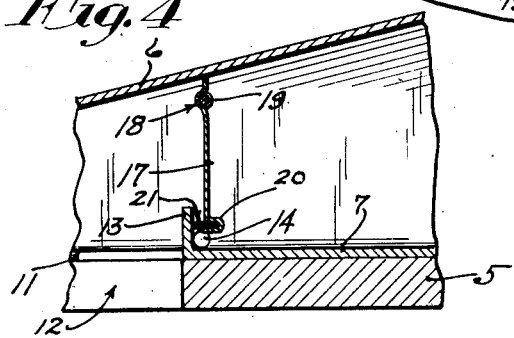
Inventor
Ivan D. Ansell
By his Attorneys Patented July 20, 1926.

1,592,841

UNITED STATES PATENT OFFICE.

IVAN D. ANSELL, OF MINNEAPOLIS, MINNESOTA.

VEHICLE VENTILATOR.

Application filed December 26, 1924. Serial No. 758,083.

My invention relates to a ventilating device which is in the nature of an improvement on my pending application "vehicle ventilator" filed June 18, 1924, under Serial Number 720,808, and which has matured into Patent Number 1,539,534, dated May 26, 1925. This type of ventilator is adapted for general use on enclosed vehicles but is especially adapted for application to the roof of a motor bus. Such a ventilating device is operative under the action of suction or partial vacuum to draw the foul air from the top of the vehicle when the same is in motion. This suction is produced in a marked degree by the form and construction of the ventilator. Moreover, the ventilator is of such form that it is storm proof, that is, rain can not reach the interior of the vehicle therethrough even in a violent storm.

To the above, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the improved ventilating device with some parts broken away and sectioned and applied to the roof of a motor bus;

Fig. 2 is a longitudinal vertical section taken on the line 2—2 of Fig. 1;

Fig. 3 is a transverse vertical section taken on the line 3—3 of Fig. 2, on an enlarged scale; and Fig. 4 is a fragmentary detail view in section taken on the line 4—4 of Fig. 1, on an enlarged scale.

In the drawings, the numeral 5 indicates what may be presumed to be the roof of a motor bus to which one of the improved ventilating devices is applied, but it is of course understood that said device may be applied elsewhere, as for example to the side of a vehicle, and one or more thereof may be used depending on the amount of ventilation required.

The improved ventilating device, as shown, includes a shell-like body 6 stamped from a single sheet of metal and a bottom plate 7 for said shell which is formed from a single sheet of metal. This body 6 flares rearwardly in vertical section, and at its front end comes nearly to an edge, and its sides flare rearwardly from the closed front end of said body toward the open and relatively large rear end thereof. The lower edge portion of the sides and front end of the body 6 are turned outward to afford an anchoring flange 8 which rests directly on the bottom plate 7 and is permanently secured thereto by spot welding, as indicated at 8'. The edge portion of the anchoring flange 8 is turned downward to form a short depending flange 9 which overlaps the edges of the bottom plate 7. This depending flange 9 not only materially assists in holding the bottom plate 7 in position in respect to the anchoring flange 8, but it gives the ventilating device a neat and finished appearance.

The ventilating device is secured to the bus roof 5 by wood screws 10 inserted through bores in the anchoring flange 8 and bottom plate 7 and turned into said roof. In place of these wood screws 10, bolts or other fastening devices may be used, which when tightened, draw the bottom plate 7 tightly against the roof 5 or its covering to form a water-tight joint between the ventilating device and roof.

The bottom plate 7, at its front edge portion, is cut away or formed with a large air intake opening 11 that registers with an air passage in the roof 5. Just rearward of the opening 11, the bottom plate 7 is formed with an upstanding baffle flange 13 that extends completely across the body 6 and is secured to the sides thereof and prevents water from running from the roof 5 into the vehicle through the co-incident openings 11 and 12.

To permit the escape of water which may be stopped by the baffle flange 13, there is formed in the sides of the body 6 just back of said flange and close to the bottom plate 7, lateral drain or water discharge passages 14.

The bottom plate 7 extends materially rearward of the top of the body 6 and the rear ends of the sides of said body extend obliquely from said top to the bottom plate 7. A depending baffle flange 15 extends from the top of the body 6 rearwardly and downwardly along the oblique rear edges of the sides of said body and are integrally formed with said top and sides. Below this baffle flange 15, the body 6 is formed with a rear end air discharge passage 16.

Extending transversely through the body 6 is a swinging gravity closed back draft damper or check 17, which, as shown, is in the form of a flat metal plate having cut and pressed therefrom reversely extending hinge lugs 18 through which extends a hinge rod 19, the end of which is mounted in seats in the sides of said body. The hinge lugs 18 are located close to the top of the damper 17 so that said damper closes under the action of gravity. This damper 17 is of such size as to extend from one side of the body 6 to the other and from the top of said body into overlapping arrangement with the back of the upstanding baffle flange 13 with just enough clearance to swing freely and rearward from said flange.

The lower edge portion of the damper 17 is folded to form in its front face a horizontally extended channel 20 in which is mounted a joint strip 21 of rubber or other suitable material. This joint strip 21 engages the back of the baffle flange 13 as a stop and forms a weather tight joint between the damper 17 and said baffle flange. By making this joint strip 21 of rubber or other flexible material, the action of the damper 17 is noiseless when stopped by the baffle flange 13 during the closing movement of said damper.

It will be noted that the shell above described has an approximately flat top so that said shell in all longitudinal sections has approximately the same inclination or pitch. Also, it will be noted that the air passages 11 and 12 are not round but approximately rectangular in plan. These features combine to give the shell approximately the same air conducting capacity at its various vertical longitudinal sections, that is, for instance, at its longitudinal center and at its longitudinal sides. Moreover, it will also be noted that the opening 16 at the rear end of the shell and the air passage in the shell above the baffle flange 13 are approximately rectangular so that the air will be discharged about equally at its various different vertical cross sections. This prevents concentration of a central stream of air and increases the efficiency of the ventilator.

Under forward movement of the vehicle, the shell, because of its forward inclination or gradual rearward rise, will cut its way through the air under very slight resistance and will raise the air and spread the same laterally, thereby producing a partial vacuum in the vicinity of the discharge opening 16 and this will produce a partial vacuum within the shell and hence an outward flow of foul air from the vehicle. In a rain storm very little water will be dashed into the shell under the depending baffle flange 13, but any water splashed into the rear portion of the shell will be intercepted by the baffle flange 13 and will run back out of the shell through the opening 16. If the vehicle is forwardly inclined so that the water tends to accumulate in the rear portion of the shell back of the baffle flange 13, said water will freely run out through the lateral drain passages 14.

When the ventilating device is functioning, the partial vacuum therein and the draft of air therethrough will hold the damper 17 open, but which damper will automatically close under the action of a back draft or sudden gust of wind and thereby prevent drafts in the vehicle.

It will also prevent rain or snow from being blown over its baffle flange 13 and into the vehicle.

The efficiency of the device has been thoroughly demonstrated in practice. The simple character of the device makes it easy to manufacture and of low manufacturing cost and, as is obvious, the device may be very easily installed on a bus, car, or any other enclosed moving vehicle.

What I claim is:

1. A ventilator comprising a rearwardly flaring shell having top, sides and bottom, a baffle declining rearwardly of said top and providing an outlet opening with said bottom, said bottom having an inlet opening at its forward portion, an upwardly extending baffle flange at the rear edge of said opening, a balanced damper suspended in the casing at a point substantially midway the ends of said top, the lower end of said damper co-operating with said baffle flange to normally close the shell between the openings, whereby air may be exhausted through said ventilator and back-draft therethrough prevented.

2. A ventilator comprising a shell having top, sides and bottom, a rear baffle at said top and providing an outlet opening with said bottom, said bottom having an inlet opening at its forward portion, an upwardly extending baffle flange at the rear edge of said opening, a balanced damper suspended in the casing at a point substantially midway the ends of said top, the lower end of said damper co-operating with said baffle flange to normally close the shell between the openings, whereby air may be exhausted through said ventilator and back-draft therethrough prevented.

In testimony whereof I affix my signature.

IVAN D. ANSELL.